(12) United States Patent
West et al.

(10) Patent No.: US 9,749,688 B1
(45) Date of Patent: Aug. 29, 2017

(54) SYSTEMS AND METHODS FOR DETERMINING MULTI-PLATFORM MEDIA RATINGS

(71) Applicant: Disney Enterprises, Inc., Burbank, CA (US)

(72) Inventors: Brian West, West Hills, CA (US); Lisa Heimann, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/188,866

(22) Filed: Jun. 21, 2016

(51) Int. Cl.
| | |
|---|---|
| *H04H 60/33* | (2008.01) |
| *H04N 21/442* | (2011.01) |
| *H04N 21/4147* | (2011.01) |
| *H04N 21/472* | (2011.01) |
| *H04N 21/81* | (2011.01) |
| *H04N 21/475* | (2011.01) |

(52) U.S. Cl.
CPC ... *H04N 21/44213* (2013.01); *H04N 21/4147* (2013.01); *H04N 21/4756* (2013.01); *H04N 21/47202* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 9,407,958 B2 * | 8/2016 | Terrazas | H04N 21/44218 |
| 9,578,361 B2 * | 2/2017 | Doe | H04N 21/25866 |

* cited by examiner

*Primary Examiner* — Kieu Oanh T Bui
(74) *Attorney, Agent, or Firm* — Farjami & Farjami LLP

(57) ABSTRACT

There is provided a system comprising a non-transitory memory storing an executable code and a hardware processor executing the executable code to receive first viewing data for a media content including a first total viewing time of the media content on a first viewing platform, receive a total possible number of viewers and a first audience composition percentage of a first audience viewing the media content on the first viewing platform, determine a first ratio by dividing the first total viewing time of the media content on the first viewing platform by a duration of the media content for the first viewing platform, and calculate a first platform rating for the media content by multiplying the first ratio by the first audience composition percentage and a first co-viewing factor and dividing by the total possible number of viewers.

20 Claims, 4 Drawing Sheets

US 9,749,688 B1

SYSTEMS AND METHODS FOR DETERMINING MULTI-PLATFORM MEDIA RATINGS

BACKGROUND

Television ratings have conventionally been extrapolated from the television viewing activity of a sample group. Ratings attempt to identify a percentage of the overall viewing population that watches a particular program when the program is broadcast. Content providers use the ratings of programs to determine program success and support value to advertisers, with shows that have higher ratings demanding higher prices for advertising. However, conventional models for determining ratings may not account for modern viewing methods and may not accurately represent the full viewing audience.

SUMMARY

The present disclosure is directed to systems and methods for determining multi-platform media ratings, substantially as shown in and/or described in connection with at least one of the figures, as set forth more completely in the claims.

DETAILED DESCRIPTION

Figure 1:
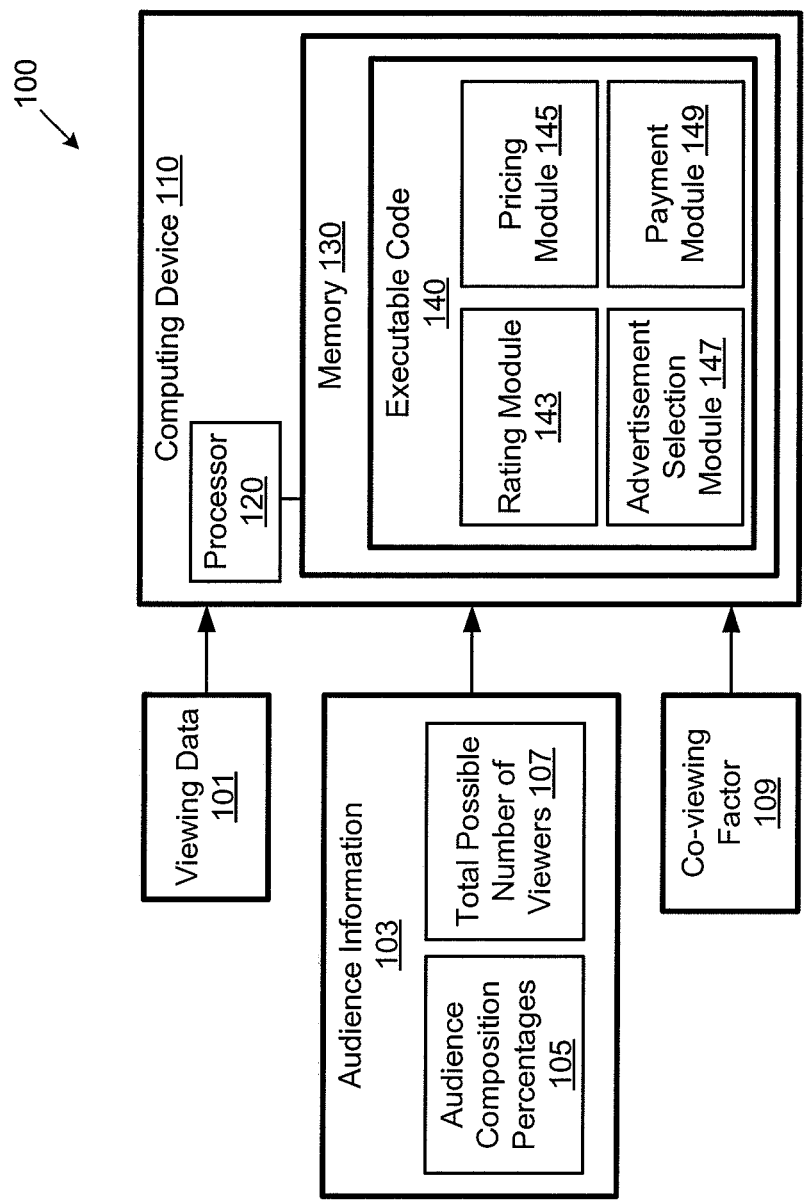
FIG. 1 shows a diagram of an exemplary system for determining multi-platform media ratings, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for determining multi-platform media ratings, according to one implementation of the present disclosure. Diagram 100 includes viewing data 101, audience information 103, co-viewing factor 109, and computing device 110. Viewing data 101 may be data related to the playback and/or viewing of a media content. The media content may be a movie, television program, sporting event, or other media content for which a content provider may wish to track the rating. In some implementations, the media content may be a television program, such as a sitcom, drama, or other episodic entertainment program, or the media content may be a news program, sporting event, etc. Viewing data 101 may include information about the media content, such as the content creator, the content provider transmitting the media content, the duration of the media content, a start time of the transmission of the media content, an end time of the transmission of the media content, an amount of the media content included in the transmission, e.g., whether the transmission or playback of the media content was terminated before the end of the media content, whether playback of the media content was subsequently resumed, etc. In some implementations, viewing data 101 may include a total viewing time that the media content is viewed on a viewing platform, including the total number of viewing minutes the media content is viewed in part or in its entirety.

Audience information 103 may include total possible number of viewers 105 and audience composition percentages 107 for that program or similar programs. In some implementations, audience information 103 may include information received from an outside source, such as The Nielsen Company. Audience composition percentages 105 may include information related to the viewing audience for that program or similar programs, such as a gender makeup of the audience, age ranges of the audience, etc. In some implementations, audience composition percentages 105 may include one or more platform-specific audience composition percentages. Platform-specific audience composition percentages may include age and/or gender breakdowns of the viewing audience for one or more viewing platforms. The age and/or gender breakdown of the viewing audience for any viewing platform may be a projection of the anticipated viewing audience, may be learned from studies based on sample groups, learned by polling viewers, collected from various user accounts that may be used to view the media content, etc. Audience composition percentages 105 may be used to modify total possible number of viewers 107 to more accurately determine an age composition and/or gender composition of the audience viewing the media content. In some implementations, audience composition percentages 105 may include a platform-specific age-group composition, a platform-specific gender composition, etc.

Total possible number of viewers 107 may include information about a viewing audience, such as a number of viewing devices to which the media content is transmitted on one or more viewing platforms, such as cable television, digital video recorder (DVR), video on demand (VOD), online streaming, etc. In some implementations, total possible number of viewers 107 may include a total number of viewing devices to which the media content is transmitted across all viewing platforms. Total possible number of viewers 107 may include a universe estimate estimating a total possible viewing audience including all viewers viewing any media content using any viewing platform. Total possible number of viewers 107 may include viewers watching the media content and viewers watching other content. In one implementation, total possible number of viewers 107 may be periodically updated, such as updated annually, semi-annually, etc.

Co-viewing factor 109 may be a factor stored in memory 130 of computing device 110. Computing device 110 may be a device for calculating the ratings of a media content watched by viewers on a viewing device. When a viewer watches the media content on the viewing device, the viewer may not be by him/her self. Accordingly, the number of devices to which the media content is transmitted may not accurately reflect the number of viewers of the media content. In some implementations, co-viewing factor 109 may be used to represent the average number of viewers viewing the media content on each viewing device, which may be useful in determining the number of viewers who view the media content. In some implementations, co-viewing factor 109 may be a platform-specific co-viewing factor. Co-viewing factor 109 may be determined by study, polling, etc. Co-viewing factor 109 may be a factor used to more accurately determine an age composition and/or gender composition of the audience viewing the media content total number of viewers.

Computing device 110 includes processor 120 and memory 130. Processor 120 is a hardware processor, such as a central processing unit (CPU), found in computing device 110. Memory 130 is a non-transitory storage device for storing computer code for execution by processor 120, and also for storing various data and parameters. Memory 130 includes executable code 140. Executable code 140 includes one or more software modules for execution by processor 120 of computing device 110. As shown in FIG. 1, executable code 140 includes rating module 143, pricing module 145, advertisement selection module 147, and payment module 149. Rating module 143 is a software module stored in memory 130 for execution by processor 120 to determine ratings of media contents viewed on one or more viewing platforms. In some implementations, rating module 143 may determine a platform-specific rating by calculating an average number of minutes of the media content viewed by each member of a viewing audience and multiplying that by a platform-specific audience composition factor. The platform-specific audience composition percentage factor may include audience composition percentages 105 and/or co-viewing factor 109. In some implementations, audience composition percentages 105 may provide a platform-specific percentage used to determine a rating for a certain age group of the viewing audience, a certain gender group of the viewing audience, etc. Audience composition percentages 105 may be a percentage and may represent a percentage of the total viewing audience predicted to make up the demographic group for which a rating is being calculated. The percentage may be learned from sample studies, polling of viewers, user account information, etc. In some implementations, rating module 143 may calculate a multi-platform rating for the media content by adding together the platform-specific ratings of the media content on two or more viewing platforms, such as an over-the-air television broadcast rating, a cable television rating, one or more DVR ratings, one or more VOD ratings, an online rating, etc.

Pricing module 145 is a software module stored in memory 130 for execution by processor 120 to set an advertising price for an advertisement to be shown during the media content on a viewing platform. In some implementations, pricing module 145 may consider the length of an advertisement in setting the advertising price. A longer advertisement may have a higher advertising price than a shorter advertisement. The advertisement price may depend on the rating of the media content. In some implementations, pricing module 145 may base the advertising price on the multi-platform rating of the media content. In other implementations, pricing module 145 may set different advertising prices for different viewing platforms with the advertising price for each viewing platform corresponding to the platform-specific rating of each viewing platform.

Advertisement selection module 147 is a software module stored in memory 130 for execution by processor 120 to select advertisements to show during the media content. In some implementations, advertising selection module 147 may select one or more advertisements corresponding to one or more advertisers to show during the media content on one or more viewing platforms. Payment module 149 is a software module stored in memory 130 for execution by processor 120 to automatically process payments for advertisements shown during the media content on one or more viewing platforms.

Figure 2:
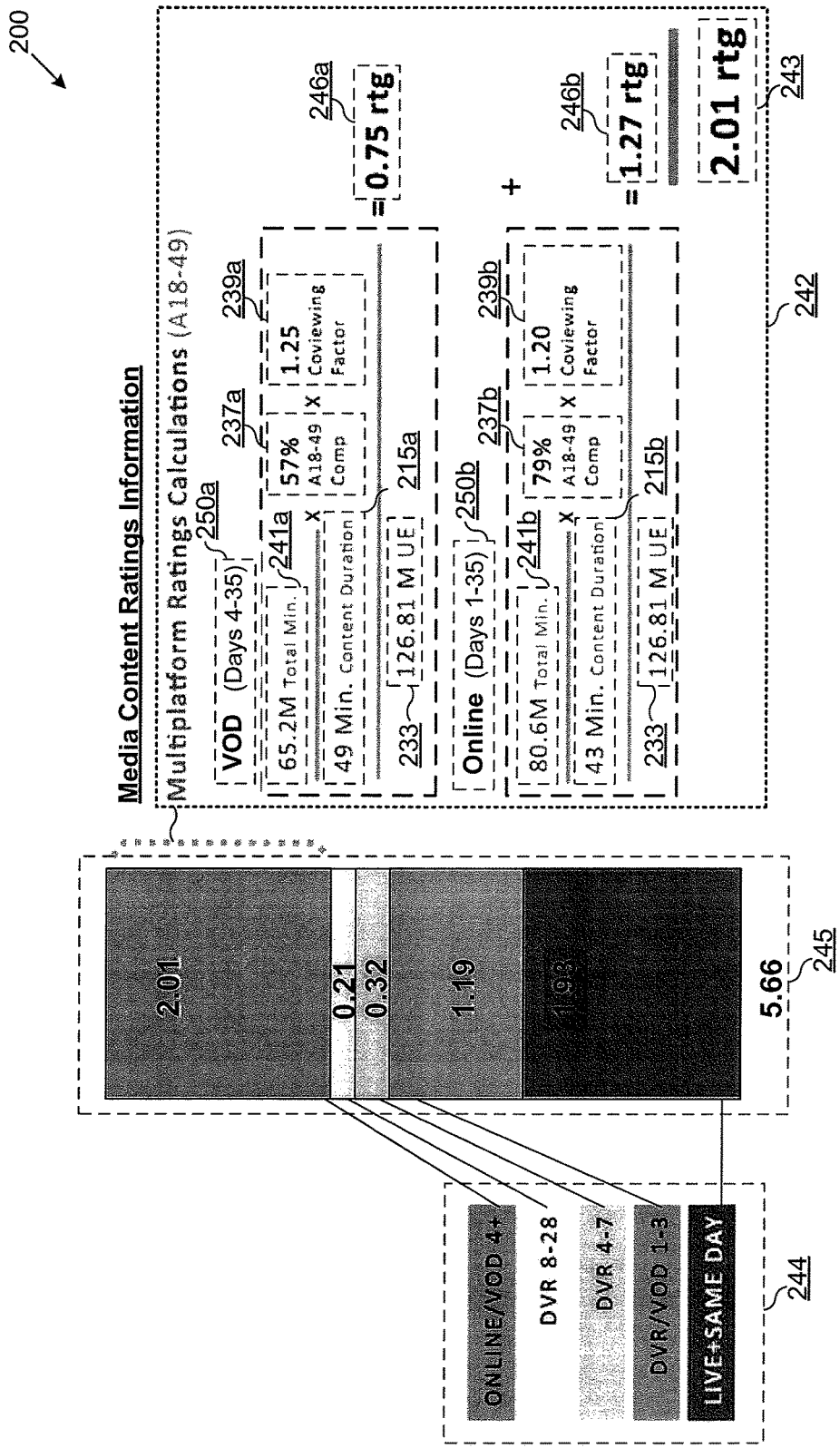
FIG. 2 shows a diagram of an exemplary approach for determining a multi-platform rating, according to one implementation of the present disclosure.

FIG. 2 shows a diagram of an exemplary approach for determining a multi-platform rating, according to one implementation of the present disclosure. Diagram 200 includes ratings windows 244, multi-platform rating 245, and multi-platform ratings calculations 242. Ratings windows 244 includes various time frames during which ratings for media contents may be determined, such as ratings for live broadcast and/or same-day viewing of a media content, DVR and/or VOD viewing for days one through three (1-3) following the live broadcast of the media content, DVR viewing of the media content on days four through seven (4-7) following the live broadcast of the media content, DVR viewing of the media content on days 8-28 following the live broadcast of the media content, and online/VOD viewing of the media content on and after day four (4) following the live broadcast of the media content. In some implementations, live broadcast and same-day viewing ratings, DVR/VOD 1-3 ratings, DVR 4-7 ratings, and DVR 8-28 ratings may be received from a rating company, such as The Nielsen Company. Multi-platform rating 245 shows a rating for each of ratings windows 244 which may be added together to determine multi-platform rating 245. Platform-specific ratings and multi-platform ratings may be calculated for any viewing window during which a viewer may view the media content.

Online and VOD ratings may be calculated using multi-platform ratings calculations 242. As shown in FIG. 2, multi-platform ratings calculation 242 individually calculates VOD rating 246a and online rating 246b, where ratings 246a and 246b represent a percent of viewing audience 233. VOD rating 246a corresponds to viewing platform 250a and online rating 246b corresponds to viewing platform 250b. Platform-specific ratings may be determined using the formula:

$$\frac{\frac{\text{Total number of viewing minutes}}{\text{Duration of the media content}} \times \frac{\text{Audience composition percentage} \times}{\text{Co-viewing factor}}}{\text{Total possible number of viewers}}$$

where the audience composition percentage may be a platform-specific age-group composition percentage, a platform-specific gender composition percentage, etc.

VOD rating 246a may be calculated based on time viewed 241a, which may include a total number of minutes of the media content is provided on the VOD viewing platform. Content duration 215a may reflect the content time for media content on VOD platform 250a. As shown in FIG. 2, the VOD platform-specific content duration 215a is forty-nine (49) minutes. The total possible viewing audience 233 is one-hundred twenty-six point eight one million (126.81 million) viewers. Audience composition factor 237a reflects an audience composition for VOD viewing of the media content by viewers between the ages of eighteen and forty-nine (18-49). Co-viewing factor 239a reflects that twenty-five percent (25%) of viewers viewing media content on VOD platform 250a have a second viewer in the desired audience demographic, here age eighteen to forty-nine (18-49), co-viewing the media content.

Online rating 246b may be calculated based on time viewed 241b, which may include a total number of minutes of the media content provided on the online viewing platform. Content duration 215b may reflect the content time for media content on online platform 250b. As shown in FIG. 2, the online platform-specific content duration 215b is forty-three (43) minutes. The total possible viewing audience 233 is one-hundred twenty-six point eight one million (126.81 million) viewers. Audience composition factor 237b reflects an audience composition for online viewing of the media content by viewers between the ages of eighteen and forty-nine (18-49). Co-viewing factor 239b reflects that twenty percent (20%) of viewers viewing media content on online platform 250b have a second viewer in the desired audience demographic, here age eighteen to forty-nine (18-49), co-viewing the media content.

Figure 3:
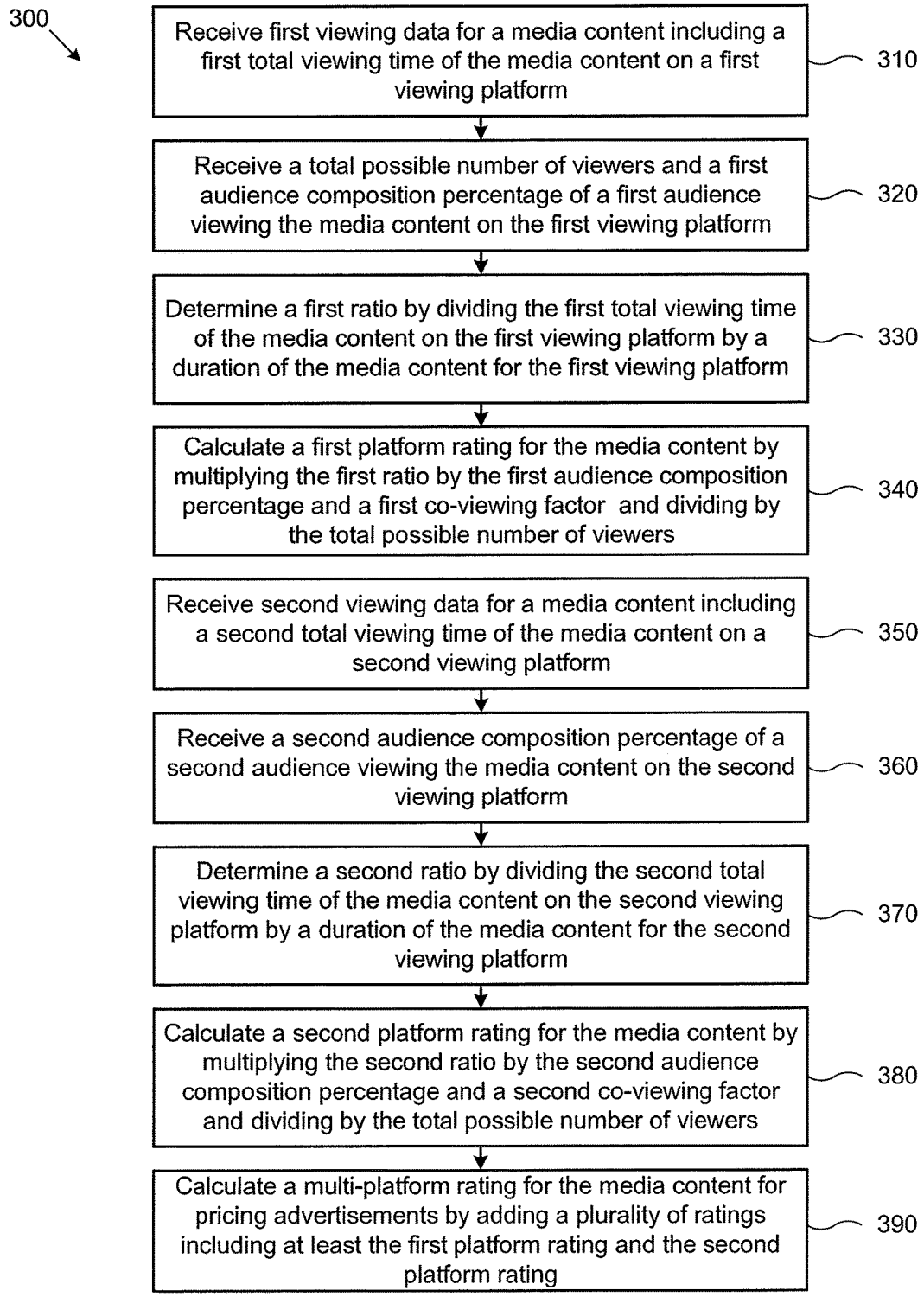
FIG. 3 shows a flowchart illustrating an exemplary method of determining multi-platform media ratings, according to one implementation of the present disclosure.

FIG. 3 shows a flowchart illustrating an exemplary method of determining multi-platform media ratings, according to one implementation of the present disclosure. Method 300 begins at 310, where executable code 140 receives viewing data 101 for a media content including a first total viewing time of the media content on a first viewing platform. In some implementations, viewing data 101 may include the amount of time the media content is played on a viewing device using one a viewing platform. The viewing platform may include cable television broadcasts, playback on a DVR or VOD device, streaming over the Internet, etc. Total viewing time of the media content may include the total number of minutes the media content is viewed, including partial playback of the media content, such as when playback of the media content is started and paused or stopped before the end of the media content. For example, if the media content is a television show with forty-two (42) minutes of content, a user may begin watching the media content and then pause playback of the media content, for example, to complete a task such as cooking dinner, answering a phone call, etc.

Viewing data 101 may include the minutes watched by the user prior to pausing the media content in the total time watched, regardless of whether the user ever resumes and/or finishes playback of the media content. Viewing data 101 may include the duration of the media content. In some implementations, the duration of the media content may include a platform-specific duration, where a viewing platform may include the runtime of the media content excluding commercial and/or promotion breaks, and another viewing platform may include the time from start to finish of the media content, including commercial and/or promotional breaks. For example, duration of the media content for an over-the-air television broadcast may be sixty (60) minutes. Playback of the same media content when the media content is streamed may have a duration of forty-two (42) minutes. Play back of the media content on VOD may have a duration of forty-seven (47) minutes. In some implementations, the platform-specific duration of the media content for various viewing platforms may include time for advertisements, station identification, promotional content, etc. In other implementations, the platform-specific duration may only include the duration of the media content.

In some implementations, viewing data 101 may include the total time of the media content viewed. The total time viewed may include the total minutes viewed during a specific time-period, such as during the time beginning on the fourth day after the initial broadcast of the media content and ending on a specific day. Data collection may continue for any time-period, such as through the thirty-fifth day after the initial broadcast of the media content and may include viewing prior to the broadcast airing or for original program viewing not associated with broadcast airing.

At 320, executable code 140 receives total possible number of viewers 107 and a first audience composition percentage of a first audience viewing the media content on the first viewing platform. In some implementations, total possible number of viewers 107 may be an estimate of the total viewing audience, such as the Nielsen Universe Estimate from The Nielsen Company. In some implementations, total possible number of viewers 107 may be updated periodically, such as weekly, monthly, etc. Total possible number of viewers 107 may include the viewing audience across all viewing platforms, such as over-the-air television, cable television, internet television, an audience viewing the media content on DVR, an audience viewing the media content on a VOD platform, an online audience streaming the media content, etc. The viewing audience may include a number of devices to which the media content is provided for viewing, such as a number of computers streaming the media content and/or a number of connected televisions showing the media content on VOD and/or DVR. Audience composition percentage may include a platform-specific age composition and/or gender composition of the audience viewing the media content on the first viewing platform.

At 330, executable code 140 determines a first ratio by dividing the first total viewing time of the media content on the first viewing platform by a duration of the media content for the first viewing platform. For example, when the online rating is being calculated, the total viewing minutes may include the total number of minutes of the media content streamed. In some implementations, the total viewing minutes may include streamed minutes of the media content viewed on viewing platforms that do not include advertisements. In other implementations, viewing platforms that do not show advertisements during the media content may not be included in the total viewing minutes. The total viewing minutes for the viewing platform are divided by the content specific duration of the media content.

At 340, executable code 140 calculates a first platform rating for the media content by multiplying the first ratio by the first audience composition percentage and a first co-viewing factor and dividing by total possible number of viewers 107. Audience composition percentages 105 may include platform-specific gender information, platform-specific age information, etc. In some implementations, audience composition percentages 105 may include an audience gender composition factor and/or an audience age composition factor. The audience composition percentage may be a factor that is less than one to reduce audience from the total viewing audience to a target audience for which ratings may be calculated, such as viewers between the ages of eighteen and forty-nine (18-49) or males or females, or a combination of the age and gender, such as males between the ages of eighteen and forty-nine (18-49). The calculation may determine a percentage of the total viewing audience that fits a specific audience demographic and is watching the media content. The ratio of the total viewing time may include the total minutes of the media content viewed on the viewing platform for which a rating is being calculated.

At 340, executable code 140 receives second viewing data for a media content including a second total viewing time of the media content on a second viewing platform. The second viewing data may include a total viewing time of the media content on a second viewing platform. For example, if the first viewing data reported total viewing time of the media content on a VOD platform, the second viewing data may include the total viewing time of the media content on a streaming platform. Method 300 continues at 350, where executable code 140 receives second viewing data for a media content including a second total viewing time of the media content on a second viewing platform. In some implementations, when the first viewing platform is VOD, the second viewing platform may be streaming. In other implementations, the first viewing platform may be streaming and the second viewing platform may be VOD.

At 360, executable code 140 receives a second audience composition percentage of a second audience viewing the media content on the second viewing platform. At 370, executable code 140 Determine a second ratio by dividing the second total viewing time of the media content on the second viewing platform by a duration of the media content for the second viewing platform. Method 300 continues at 380, where executable code 140 calculates a second platform rating for the media content by multiplying the second ratio by the second audience composition percentage and a second co-viewing factor and dividing by total possible number of viewers 107.

At 390, executable code 140 calculates a multi-platform rating for the media content for pricing advertisements by adding a plurality of ratings including at least the first platform rating and the second platform rating. The multi-platform rating may include ratings from a plurality of viewing platforms, such as an over-the-air television broadcast rating, a cable television rating, one or more DVR ratings, one or more VOD ratings, an online rating, etc. In some implementations, the online rating may include ratings from one or more online streaming services such as Netflix, Hulu, streaming from a service provider, such as streaming through an online account provided by a cable provider, and/or streaming from a content provider. Calculating the platform-specific ratings including audience composition information may allow ratings from various viewing platforms to be added together to provide an accurate rating across all viewing platforms. In one implementation, content providers use the ratings of programs to set pricing for advertisers, with shows that have higher ratings demanding higher prices for advertising. In one implementation, the advertisements may be selected and shown based on the ratings and prices, and the advertisers may automatically be charged the prices after showing the advertisements.

The platform-specific rating and the multi-platform rating of the media content may be used to support programming decisions. In some implementations, a higher rating on a specific platform may indicate a higher percentage of total possible number of viewers 107 are watching the media content on that specific platform, whereas a higher multi-platform rating may indicate an overall popularity of the media content. Platforms that have higher platform-specific ratings may help inform availability and marketing of the media content on platforms with higher platform specific ratings. The platform-specific ratings may support domestic and international distribution of the media content after the network window has passed.

Figure 4:
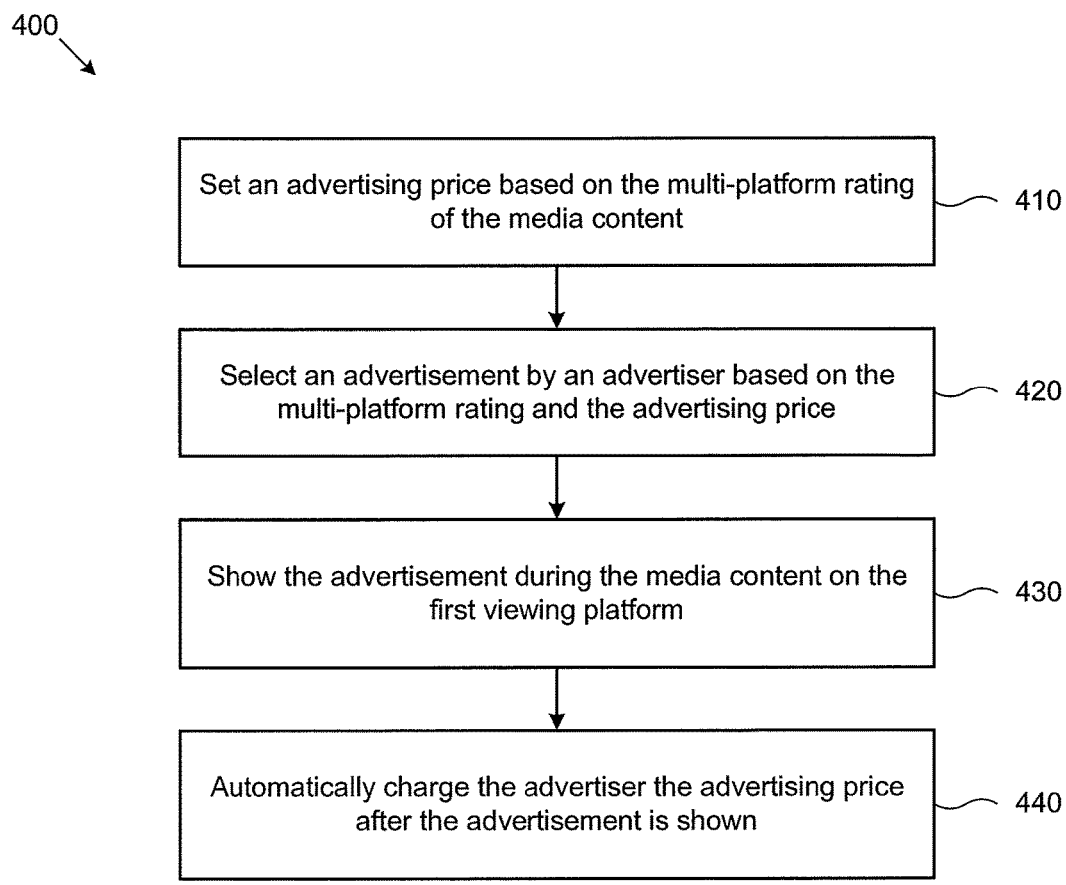
FIG. 4 shows a flowchart illustrating an exemplary method of selecting and paying for advertising based on platform-specific media ratings, according to one implementation of the present disclosure.

FIG. 4 shows a flowchart illustrating an exemplary method of selecting and paying for advertising based on platform-specific media ratings, according to one implementation of the present disclosure. Method 400 begins at 410, where executable code 140 sets an advertising price based on the multi-platform rating of the media content. A higher first platform rating may indicate that the percentage of the total possible number of viewers may see an advertisement that is run during the media content, and the advertising price may be higher. A lower multi-platform rating may indicate that a lower percentage of the total possible number of viewers may see the advertisement, and the advertising price may be lower. In some implementations, different viewing platforms may have different advertising prices based on the platform-specific rating corresponding to the viewing platform. At 420, executable code 140 selects an advertisement by an advertiser based on the multi-platform rating of the media content and the advertising price. In some implementations, the advertiser may want to advertise a particular product or service during the media content. The advertiser may create a plurality of advertisements for the same product or service, each advertisement of the plurality of advertisements having a different length, with longer advertisements typically costing more to show during the media content. Selecting the advertisement to show during the media content may include determining a combination of the length of the advertisement and the advertising price to fit the advertiser's desires. For example, the advertiser may choose to run a shorter advertisement more times, resulting in more audience impressions, or to run a longer, possibly more impactful advertisement less times.

At 430, executable code 140 shows the advertisement during the media content on the first viewing platform. In some implementations, the advertisement may play at the beginning of the media content on the first viewing platform, after the media content on the first viewing platform, during an advertising break in the media content on the first viewing platform, etc. Method 400 continues at 440, where executable code 140 automatically charges the advertiser the advertising price after the advertisement is shown.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing an executable code; and
   a hardware processor executing the executable code to:
   receive first viewing data for a media content including a first total viewing time of the media content on a first viewing platform;
   receive a total possible number of viewers and a first audience composition percentage of a first audience viewing the media content on the first viewing platform;
   determine a first ratio by dividing the first total viewing time of the media content on the first viewing platform by a duration of the media content for the first viewing platform; and calculate a first platform rating for the media content by multiplying the first ratio by the first audience composition percentage and a first co-viewing factor and dividing by the total possible number of viewers.

2. The system of claim 1, wherein the hardware processor further executes the executable code to:
receive second viewing data for a media content including a second total viewing time of the media content on a second viewing platform;
receive a second audience composition percentage of a second audience viewing the media content on the second viewing platform;
determine a second ratio by dividing the second total viewing time of the media content on the second viewing platform by a duration of the media content for the second viewing platform; and
calculate a second platform rating for the media content by multiplying the second ratio by the second audience composition percentage and a second co-viewing factor and dividing by the total possible number of viewers.

3. The system of claim 2, wherein the hardware processor further executes the executable code to:
calculate a multi-platform rating for the media content by adding a plurality of ratings including at least the first platform rating and the second platform rating.

4. The system of claim 3, wherein the multi-platform rating for the media content further includes at least one of a television rating and a digital video recorder (DVR) rating.

5. The system of claim 2, wherein the first viewing platform is one of a streaming platform and a video on demand (VOD) platform, and the second viewing platform is the other.

6. The system of claim 1, wherein the duration of the media content is a platform-specific duration of the media content.

7. The system of claim 1, wherein the first platform rating is used to set an advertising price, and the processor executes the executable code to:
select an advertisement based on the first platform rating and the advertising price;
show the advertisement during the media content on the first viewing platform; and
automatically charge an advertiser the advertising price after the advertisement is shown.

8. The system of claim 1, wherein the first total viewing time of the media content includes partial viewings of the media content.

9. The system of claim 1, wherein the first audience composition percentage includes a platform-specific gender composition.

10. The system of claim 1, wherein the first audience composition percentage includes a platform-specific age-group composition.

11. A method for use with a system including a non-transitory memory storing a co-viewing factor database and a hardware processor, the method comprising:
receiving, using the hardware processor, first viewing data for a media content including a first total viewing time of the media content on a first viewing platform;
receiving, using the hardware processor, a total possible number of viewers and a first audience composition percentage of a first audience viewing the media content on the first viewing platform;
determining, using the hardware processor, a first ratio by dividing the first total viewing time of the media content on the first viewing platform by a duration of the media content for the first viewing platform; and
calculating, using the hardware processor, a first platform rating for the media content by multiplying the first ratio by the first audience composition percentage and a first co-viewing factor and dividing by the total possible number of viewers.

12. The method of claim 11, further comprising:
receiving, using the hardware processor, second viewing data for a media content including a second total viewing time of the media content on a second viewing platform;
receiving, using the hardware processor, a second audience composition percentage of a second audience viewing the media content on the second viewing platform;
determining, using the hardware processor, a second ratio by dividing the second total viewing time of the media content on the second viewing platform by a duration of the media content for the second viewing platform; and
calculating, using the hardware processor, a second platform rating for the media content by multiplying the second ratio by the second audience composition percentage and a second co-viewing factor and dividing by the total possible number of viewers.

13. The method of claim 12, further comprising:
calculating, using the hardware processor, a multi-platform rating for the media content by adding a plurality of ratings including at least the first platform rating and the second platform rating.

14. The method of claim 13, wherein the multi-platform rating for the media content further includes at least one of a television rating and a digital video recorder (DVR) rating.

15. The method of claim 12, wherein the first viewing platform is one of a streaming platform and a video on demand (VOD) platform, and the second viewing platform is the other.

16. The method of claim 11, wherein the duration of the media content is a platform-specific duration of the media content.

17. The method of claim 11, wherein the first platform rating is used to set an advertising price, the method further comprising:
selecting, using the hardware processor, an advertisement based on the first platform rating and the advertising price;
showing, using the hardware processor, the advertisement during the media content on the first viewing platform; and
automatically charging, using the hardware processor, an advertiser the advertising price after the advertisement is shown.

18. The method of claim 11, wherein the first total viewing time of the media content includes partial viewings of the media content.

19. The method of claim 11, wherein the first audience composition percentage includes a platform-specific gender composition.

20. The method of claim 11, wherein the first audience composition percentage includes a platform-specific age-group composition.

* * * * *